United States Patent [19]

Tsujikawa et al.

[11] Patent Number: 5,051,570
[45] Date of Patent: Sep. 24, 1991

[54] LIQUID CRYSTAL LIGHT VALVE SHOWING AN IMPROVED DISPLAY CONTRAST

[75] Inventors: Susumu Tsujikawa; Fujio Okumura, both of Tokyo, Japan

[73] Assignee: NEC Corporation, Tokyo, Japan

[21] Appl. No.: 467,168

[22] Filed: Jan. 19, 1990

[30] Foreign Application Priority Data

Jan. 20, 1989 [JP] Japan .................................. 1-12373
Apr. 24, 1989 [JP] Japan ................................. 1-105307
Jun. 21, 1989 [JP] Japan ................................. 1-156829

[51] Int. Cl.⁵ .......................... G02F 1/13; G01D 5/34
[52] U.S. Cl. .................................. 250/201.1; 250/229; 359/72; 359/59
[58] Field of Search ............... 350/342, 332, 333, 336; 340/765, 784, 805; 250/229, 208.1, 208.2, 208.4, 208.5, 211 J, 213 R, 214 R, 201.1

[56] References Cited

U.S. PATENT DOCUMENTS

| | | | |
|---|---|---|---|
| 4,191,452 | 3/1980 | Grinberg et al. | 350/342 |
| 4,345,248 | 8/1982 | Togashi et al. | 350/342 |
| 4,432,611 | 2/1984 | Wei | 350/342 |
| 4,534,622 | 8/1985 | Harada et al. | 350/534 |
| 4,653,860 | 3/1987 | Hendrix | 350/336 |
| 4,655,552 | 4/1987 | Togashi et al. | 350/342 |
| 4,655,554 | 4/1987 | Armitage | 350/386 |
| 4,679,909 | 7/1987 | Hamada et al. | 350/333 |
| 4,693,561 | 9/1987 | Ashley | 350/336 |
| 4,726,660 | 2/1988 | Rushford | 350/342 |
| 4,812,019 | 3/1989 | Dietrich et al. | 350/342 |
| 4,818,077 | 4/1989 | Ohwada et al. | 350/333 |
| 4,846,559 | 7/1989 | Kniffler | 350/342 |
| 4,868,616 | 9/1989 | Johnson et al. | 350/342 |
| 4,884,875 | 12/1989 | Okumura | 350/342 |
| 4,925,276 | 5/1990 | McMurray, Jr. et al. | 350/342 |
| 4,936,656 | 6/1990 | Yamashita et al. | 350/338 |
| 4,941,735 | 7/1990 | Moddel et al. | 250/213 R |

FOREIGN PATENT DOCUMENTS 0070530 6/1981 Japan .................................. 350/342

OTHER PUBLICATIONS

"Application of the Liquid Crystal Light Valve to Real-Time Optical Processing", W. P. Bleha et al., Optical Engineering, Jul.-Aug. 78/vol. 17, No. 4.

Primary Examiner—David C. Nelms
Assistant Examiner—Michael Messinger
Attorney, Agent, or Firm—Burns, Doane, Swecker & Mathis

[57] ABSTRACT

An optically-addressed liquid crystal light valve comprises a transparent insulating substrate having either one-dimensional or two-dimensional arrays of optical switching elements thereon which can perform switching with an incident light, another opposing transparent substrate having transparent electrodes and a liquid crystal sandwiched therebetween. Each of the light switching elements comprises a photo-detector circuit and a thin-film-transistor (TFT) drive circuit. The photo-detector circuit comprises a serially connected photodiode and a passive element such as capacitor or resistor. The TFT drive circuit receives as input the voltage produced from the photo-detector circuit, while the output voltage from the TFT drive circuit is applied to one pixel electrode for the liquid crystal.

6 Claims, 9 Drawing Sheets

LIQUID CRYSTAL LIGHT VALVE SHOWING AN IMPROVED DISPLAY CONTRAST

BACKGROUND OF THE INVENTION

This invention relates to a liquid crystal light valve and, more particularly, to an optically-addressed liquid crystal light valve.

Liquid crystal light valve (LCLV) is an optical switching element used for light projection display, optical data processing, etc. An article entitled "Application of the Liquid Crystal Light Valve to Real-Time Optical Data Processing" by W. P. Bleha et al., in "Optical Engineering", vol. 17, No. 4, July-August, 1978, pp. 371-384 discloses an optically-addressed LCLV wherein the device is embodied by sandwiching a film structure of a cadmium sulfide (CdS) photoconductor film, a cadmium telluride (CdTe) light-absorbing film, a multilayered reflection film and a liquid crystal between transparent conductive films formed on a pair of transparent substrates respectively. When a predetermined ac voltage is applied between the transparent conductive films, the liquid crystal is impressed with a partial voltage divided by a parasitic capacitance of the liquid crystal and a parallel connection of parasitic resistance and capacitance of a structure formed of the multilayered reflection film, the CdTe film, and the CdS film. When signal light comes in from the transparent substrate on the side of the CdS film, the resistance of the illuminated portion of the CdS film becomes lowered to thereby increase the partial voltage applied to the liquid crystal. The reflection of the projection light incident to the substrate on the side of liquid crystal is varied by controlling the molecular alignment of liquid crystal with the changes in applied voltage.

The foregoing prior art LCLV has at least two problems.

One problem is the difficulty in obtaining a sufficient display contrast. As mentioned above, the partial voltage applied to the liquid crystal is a value divided by the aforementioned parasitic capacitance and the parasitic parallel connection. Therefore, when the impedance of CdS film is varied extensively, the voltage applied on the parasitic capacitance of the liquid crystal would not change proportionally. As the variation in partial voltage is small, a display contrast cannot be set beyond 5 to 8.

Another problem is the difficulty in the manufacture of LCLV which required various time consuming processes. To increase the variation of the divided partial voltage, the thickness of CdS film must be made sufficiently thick. However, as will be discussed in more detail hereinafter, it is not easy to form a thick CdS film.

SUMMARY OF THE INVENTION

An object of the present invention is to provide an LCLV which can achieve a high contrast and which can be manufactured simply.

According to the present invention, a liquid crystal light valve comprises a transparent insulating substrate having either one-dimensional or two-dimensional arrays of light switching elements thereon which can perform switching with an incident light, another opposing transparent substrate having transparent electrodes and a liquid crystal sandwiched therebetween. Each of the light switching elements comprises a photodetector circuit and a thin film transistor (TFT) drive circuit. The photo-detector circuit comprises a serial connection of a photodiode and a passive element such as a resistor or capacitor. The TFT drive circuit receives as input the voltage generated by the photodetector circuit, while the output voltage from the TFT drive circuit is applied to one pixel electrode for the liquid crystal.

DESCRIPTION OF THE PREFERRED EMBODIMENTS

Before describing embodiments of the present invention, a prior art light-addressed LCLV will be explained in detail by referring to FIGS. 1A and 1B. On a real glass substrate 351 are formed successively a transparent conductive film 361, a CdS photoconductor film 371, a CdTe light absorbing film 381, and a multilayered reflector film 391 comprising an appropriate number of insulating films of different refractive indices. Liquid crystal 521 is sandwiched between the multilayered reflector film 391 and a transparent conductor film 411 formed on a front glass substrate 421 via a spacer 401. Although not shown in the drawings, there is provided an orientation alignment film of liquid crystal on a surface of the multilayered reflector film 391 or the transparent conductor film 411 so as to contact the liquid crystal. There is provided a polarizing plate 431 on the outer surface of the front glass substrate 421. The signal light 441 enters from the side of the rear glass plate 351 while the projection light 451 comes from the side of the polarizing plate 431. The equivalent circuit of the LCLV comprises, as shown in FIG. 1B, the parasitic capacitor 461 of the liquid crystal 521, the parasitic capacitor 471 of the multilayered reflecting film 391, the parasitic resistor 481 and the parasitic capacitor 491 of the light absorbing film 381 consisting of CdTe, and the parasitic resistor 501 and the parasitic capacitor 511 of the photoconductive film 371 consisting of CdS. Namely, the equivalent circuit is represented as a state in which the parasitic resistor 481 and the parasitic capacitor 491 of the light absorbing film 381 are connected in parallel, the parasitic resistor 501 and the parasitic capacitor 511 of the photoconductive film 371 are connected in parallel, and the parasitic capacitor 461 of the liquid crystal 521, the parasitic capacitor 471 of the multilayered reflecting film 391, the parallel circuit of the parasitic resistor 481 and the parasitic capacitor 491 of the light absorbing film 381, and the parallel circuit of the parasitic resistor 501 and the parasitic capacitor 511 of the photoconductive film 371 are connected in series as shown in FIG. 1B.

The principle of operation of the above described device with the above construction is as described below.

First, in the operating condition, a predetermined ac voltage is applied between the transparent conductive films 361 and 411, and a voltage divided by the parasitic capacitors 461, 471, 491, and 551 is applied to the liquid crystal 521. The reason for this is that the respective parasitic resistors 481 and 501 have very large resistances in the dark state.

Figure 1A:
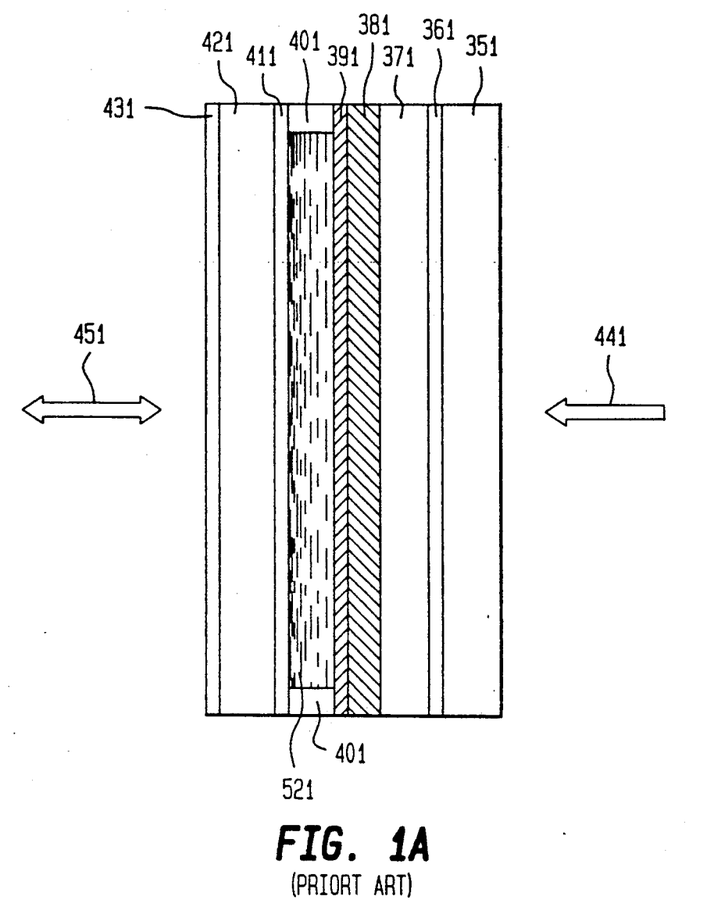
FIG. 1A shows a sectional view of the prior art liquid crystal light valve.
Figure 1B:
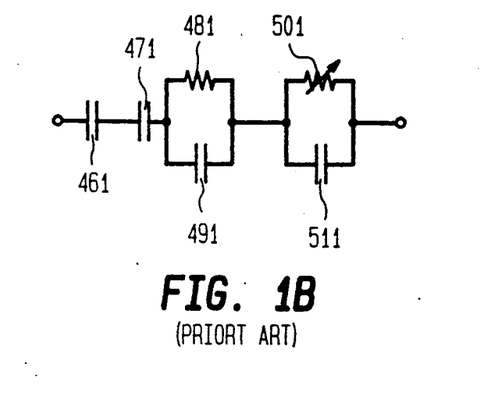
FIG. 1B shows an equivalent circuit of the device in FIG. 1A.

Now, when a signal light 441 impinges upon the device from the side of one of the glass substrates, namely 351, as shown in FIG. 1A, the resistance at the portion of CdS of light incidence in the photoconductive film 371 is diminished. That is, in terms of the equivalent circuit shown in FIG. 1B, the resistance of the parasitic resistor 501 of CdS becomes small. Accordingly, the parasitic capacitor 511 of CdS becomes nearly short-circuited so that the capacitance of the parasitic capacitor, and hence the voltage applied to the liquid crystal 521, is increased. In other words, as explained above, the parasitic resistor 501 and the parasitic capacitor 511 of the photoconductive film 371 are connected mutually in parallel, while a voltage obtained by dividing the ac voltage applied to the pair of transparent conductive film 361 with the parasitic capacitors 461, 471, 491, and 511 is applied to the liquid crystal 521. Therefore, when one of these parasitic capacitors, namely 511, is nearly short-circuited, the voltage to be applied to the liquid crystal is increased accordingly.

In the above device, the projection light 451 is modulated by controlling the liquid crystal 521 with this change in the voltage. It is to be noted that the role of the light absorbing film 381 is to prevent the projection light 451 from reaching the photoconductive film 371 made of CdS.

In this manner, the liquid crystal light valve shown in FIG. 1 can be employed as a light modulating element used for optical information processing and the like.

It should be pointed out, however, the aforementioned prior art liquid crystal light valve has at least the following two problems related to its fabrication and performance.

Namely, one of the problems is that the manufacture of the device is difficult and requires a long time.

As can be seen from the equivalent circuit in FIG. 1B, when it is desired to increase the change in the voltage to be applied to the parasitic capacitor 461 for the liquid crystal 521, the parasitic capacitor 511 of CdS has to be chosen sufficiently small relative to the parasitic capacitor 461 of the liquid crystal 521. In order to achieve that purpose, the thickness of the CdS film has to be made sufficiently large. However, it is not easy to produce a thick CdS film. Ordinarily, the film thickness of CdS required is 15 to 20 $\mu$m, and moreover, polishing is required during the film formation in order to obtain a film which is free from fogging.

In the past, film formation is normally accomplished by sputtering, and it used to take 10 to 20 hours in forming a film with the above-mentioned thickness, including the time for the polishing. Moreover, there are required the formation of the CdTe film of about 2 $\mu$m and a multilayered insulating film. Consequently, the completion of a single element used to require a considerably long period of time.

The other problem is that the dynamic range of the device is limited so that a high contrast cannot be achieved.

As was mentioned in connection with the principle of operation, the voltage to be applied to the parasitic capacitor 461 of the liquid crystal 521 is obtained by dividing the externally applied voltage with the parasitic capacitors 471, 491, and 511 of the CdS film, the CdTe film, and the multilayered reflecting film 391, respectively. Therefore, the voltage applied to the parasitic capacitor 461 of the liquid crystal 521 will not be varied too much even when the capacitance of the parasitic capacitor 511 of the photoconductor film 371 is varied to a large extent. Because of the small change in the voltage, the display contrast in the past could only achieve about 5 to 8 as a matter of fact.

Description will now be given to preferred embodiments of an LCLV according to this invention which is free of the aforementioned defects in the prior art LCLVs and which can be made simply and yet can achieve a higher contrast.

Figure 2:
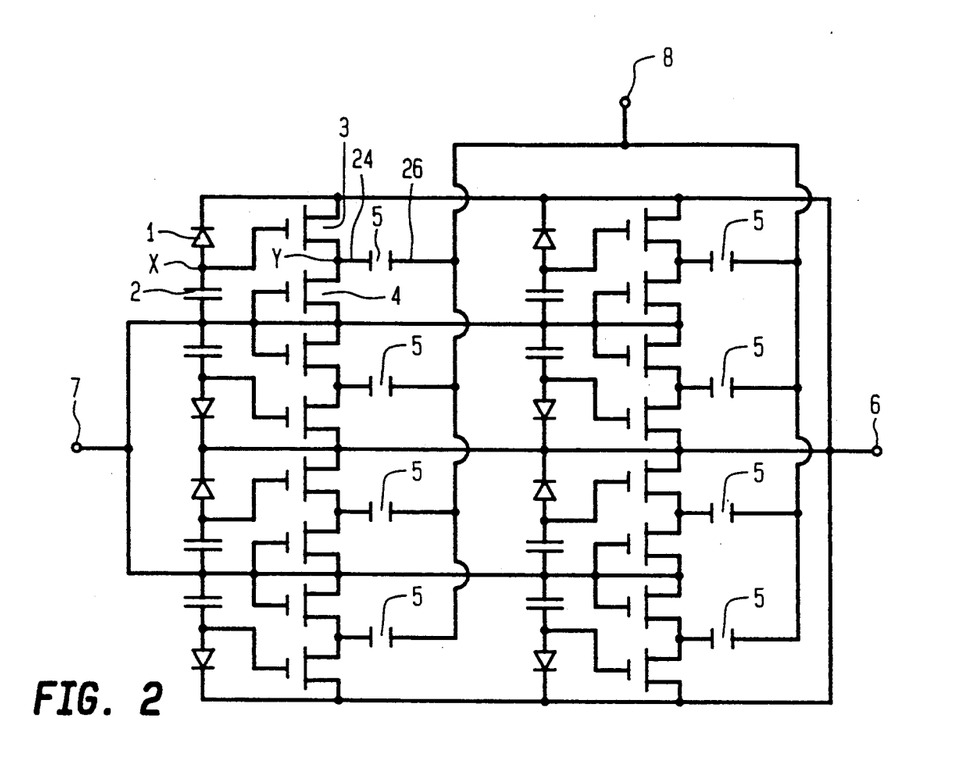
FIG. 2 shows an equivalent circuit of the liquid crystal light valve according to a first embodiment of the present invention.

Referring to the equivalent circuit shown in FIG. 2, an optical switching element in one pixel of the LCLV comprises a photo-detector circuit and a drive circuit. Namely, the anode of a photodiode 1 is connected to one of the terminals of a capacitor 2 at a node designated by X while the cathode of the photodiode 1 is connected to a high voltage terminal 6, and the other terminal of the capacitor 2 is connected to a low voltage terminal 7 to form the photo-detector circuit. A pair of serially connected thin film transistors 3 and 4 form a thin film transistor (TFT) drive circuit. In FIG. 2, the TFT drive circuit constitutes a source follower circuit. That is, the drain of the thin film transistor 3 is connected to the high voltage terminal 6, the source of the transistor 3 is connected to the drain of the transistor 4 at a node designated Y, and the gate and the source of the transistor 4 are connected to the low voltage terminal 7. The gate of the transistor 3 is connected to the node X while the node Y is connected to a pixel electrode 24. In other words, the nodes X and Y are input and output terminals of the TFT drive circuit.

A large number of the optical switching parts with the above construction are arranged in an array form. In the case of FIG. 2, an example of a matrix arrangement of eight pixels corresponding to form rows and two columns is shown.

Each of the pixel cells 5 is sandwiched between a pixel electrode 24 and an opposed transparent electrode 26. The transparent electrodes 26 are commonly connected to a counter electrode terminal 8.

The operation of the liquid crystal light valve with the above construction is as described below.

When the photodiode 1 is irradiated with light for a predetermined period of time, the photodiode 1 generates a current that is proportional to the intensity of light, and the charge corresponding to the current is stored in the capacitor 2. Since the photodiode 1 has an excellent linearity between the current and the detected light intensity, the changes stored in the capacitor 2 is proportional to the quantity of the incident light.

Thus a produced voltage change at the node X is served as the input voltage to the source follower circuit formed by the thin film transistors 3 and 4. The source follower circuit outputs a voltage identical to the input voltage at the node Y. That is, the output voltage from the photo-detector circuit is subjected to impedance conversion to be applied to the pixel electrode 24. When the voltage to be applied to a counter electrode terminal 8 is set at middle-voltage of the high voltage and the low voltage such as ground level while positive voltage and negative voltage are applied to the high voltage terminal 6 and the low voltage terminal 7, respectively, positive or negative voltage depending on the intensity of the light is applied to the liquid crystal cell 5. This enables variation in voltage applied to the liquid crystal which is larger than the prior art LCLV. Hence the high display contrast can be achieved with excellent linearity.

Figure 3:
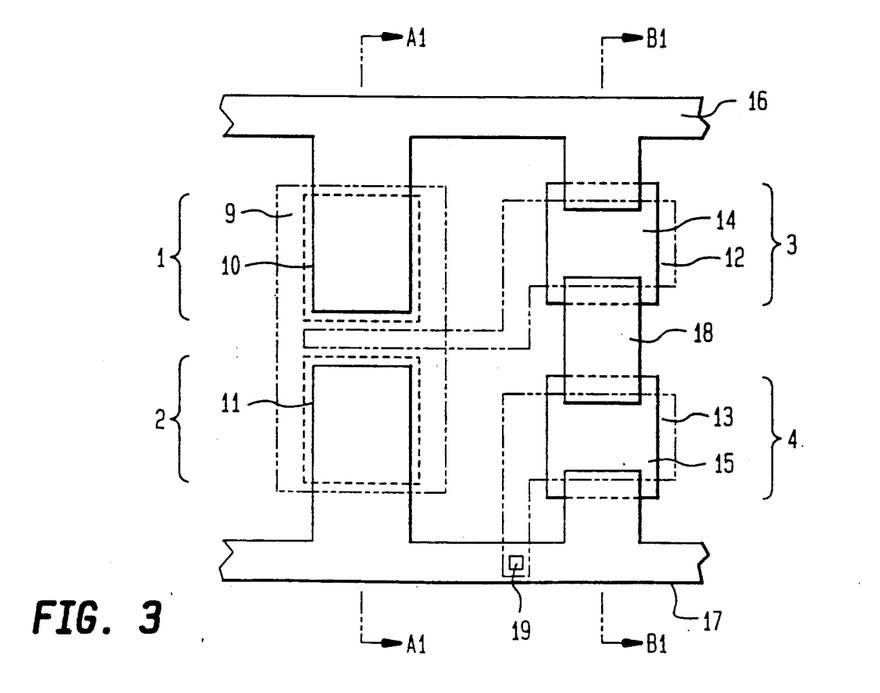
FIG. 3 shows a plan view for explaining a first embodiment of the structure of one unit of an optical switching portion in FIG. 2.
Figure 4A:
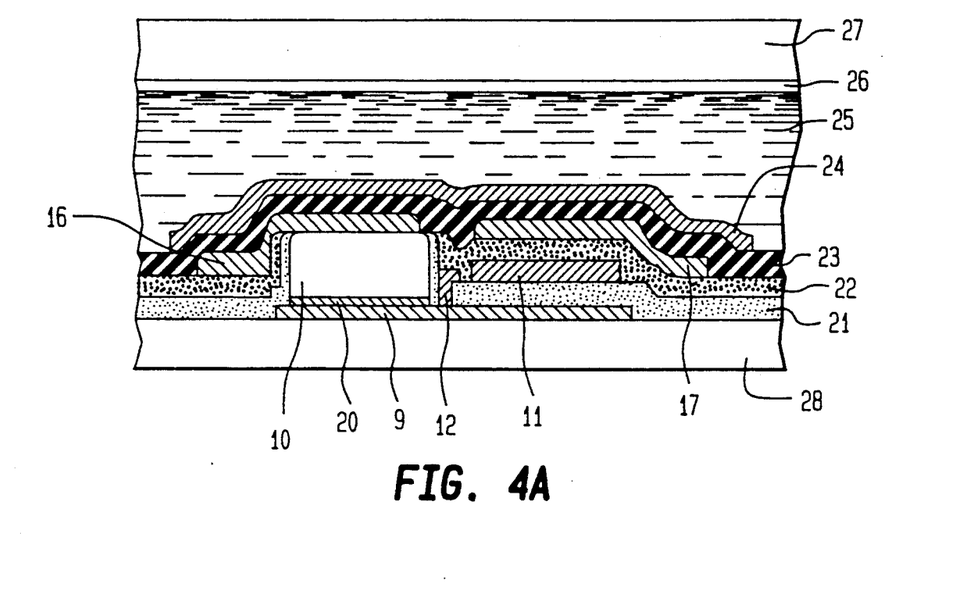
FIG. 4A shows a sectional view taken along the line A1—A1 in FIG. 3.
Figure 4B:
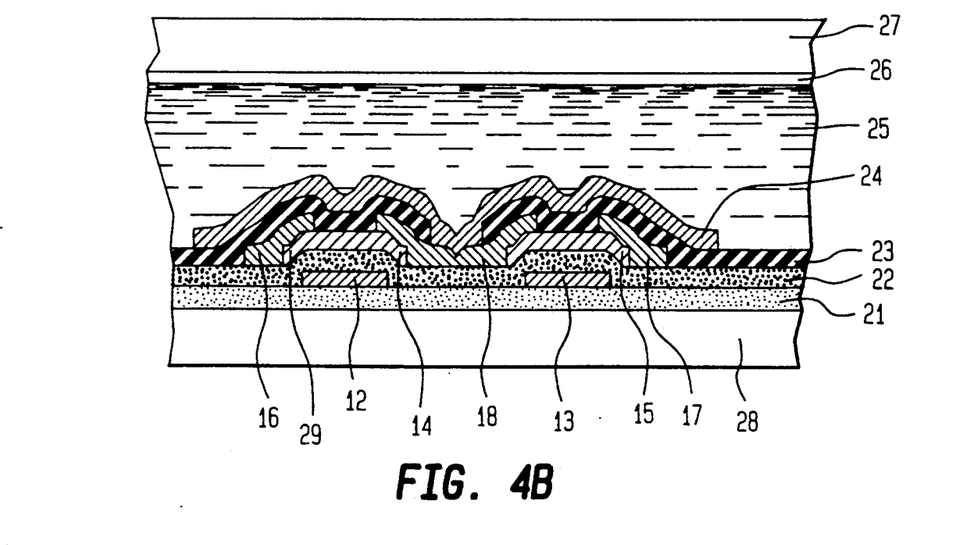
FIG. 4B shows a sectional view taken along the line B1—B1 in FIG. 3.

Referring to FIG. 3 and FIG. 4, a practical structure and a fabrication process thereof will be described.

A photodiode 1, capacitor 2, thin film transistors 3 and 4 are formed on a glass substrate 28. The photodiode 1 comprises light absorbing layers 10 and 20 sandwiched between the high voltage electrode 16 and a transparent electrode 9 for connecting the photodiode 1 and the capacitor 2. The capacitor 2 comprises a dielectric layer 21, an intermediate layer 11 and a dielectric layer 22 sandwiched between the electrode 9 and a low voltage electrode 17. Thin film transistors 3 and 4 comprises gate electrodes 12 and 13 under a gate insulating film 22 and active layers 14 and 15. The high voltage electrode 16 and the low voltage electrode 17, and a connecting electrode 18 for connecting both thin film transistors 3 and 4 are formed on the active layers 14 and 15. A contact hole 19 is provided for connecting the gate electrode 13 and the low voltage electrode 17. An insulating film 21 under gate electrodes 12 and 13 serves also as a dielectric portion, of the capacitor 2. An interlayer insulating film 23 and a pixel electrode 24 are provided on the optical switching portion. The interlayer insulating films 23 is formed to insulate a pixel electrode 24 from the thin film transistors 3 and 4. The pixel electrode 24 is connected to the connecting electrode 18. A liquid crystal 25 is sandwiched between a transparent conductive film 26 provided on a glass substrate 27 and pixel electrode 24.

It should be mentioned that a polarizing plate (not shown) is placed on the glass substrate 27 as will be described later, and that a signal light is arranged to be incident on the device from the side of the glass substrate 28 while a projected light is incident from the side of the glass substrate 27.

A typical example of manufacturing process of the above embodiment is described below by using an amorphous silicon for a heterojunction layer of the photodiode 1 and the active layers 14 and 15 of the thin film transistors 3 and 4. It is to be noted that the photodiode 1 here makes use of a heterojunctioned type of amorphous silicon and P-type amorphous SiC.

First, a 2000 angstrom (A)-thick indium-tin-oxide (ITO) film is formed on the glass substrate 28 by sputtering, and the electrode 9 for the photodiode 1 and the capacitor 2 are formed by patterning as shown in FIG. 3.

Next, a 600 A-thick P-type amorphous SiC film 20 is formed as a light absorbing layer by decomposing the mixture of silane ($SiH_4$) and methane ($CH_4$) by plasma CVD. As the dopant, hydrogen-based diborance ($B_2H_6$) is used. Following that, a 1000 A (namely 1 $\mu$m-) thick amorphous silicon film is formed. A heterojunction layer, that is, the light absorbing layer indicated by the reference numeral 10, of the photodiode 1 is formed by patterning the film just mentioned.

Next, a 3000 A-thick silicon nitride film 21 is formed by decomposing the mixture of silane, ammonia ($NH_3$), and nitrogen to be used as a dielectric of the thin film capacitor. Namely, it is used as an insulating film which is also served as the dielectric of the capacitor 2.

Then, a hole is provided for establishing a contact between the gate electrode 12 of the thin film transistor 3 and the electrode 9 for the photodiode 1 and the capacitor 2. A 3000 A-thick chromium film is formed on it by sputtering, and the gate electrodes 12 and 13 for the two thin film transistors 3 and 4 of the source follower circuit are created by patterning the chromium film.

Next, a 3000 A-thick silicon nitride film is formed by a method similar to that used for the dielectric or the insulating film 21 to be used as the gate insulating film 22 for the thin film transistor 3 and 4. Following that a 2000 A-thick amorphous silicon film is formed by decomposing silane. Still following that, a 300 A-thick n+-type amorphous silicon film 29 that is rich in phosphorus is formed as shown in FIG. 4B by decomposing the mixture of silane and phosphine ($PH_3$). The active layers 14 and 15 of the thin film transistors 3 and 4 are created by patterning the film 29. The n+-type amorphous silicon film 29 is for establishing an ohmic contact with the various electrodes that are to be formed on the amorphous silicon layer 29. Here, the transistor active layers 14 and 15 are respectively made into layers of depletion type by implanting ions to part of each layer.

Next, holes are opened for establishing a contact between the light absorbing layer 10 of the photodiode 1 and the high voltage electrode 16, and between the gate electrode 13 and the low voltage electrode 17. A 3000 A-thick chromium film is formed on them by sputtering, and the high voltage electrode 16, the low voltage electrode 17, and a connecting electrode 18 are created by patterning the chromium film. In this process, the n+-type amorphous silicon film 29 formed previously is removed by using the electrodes as a mask.

Next, an interlayer insulating film 23 consisting of a 3000 A-thick silicon nitride film is formed on top of it by a method similar to that for the insulating film 21 and the gate insulating film 22 (see FIGS. 4A and 4B), and a hole for establishing a contact between the connecting electrode 18 and the pixel electrode 24 is created in the interlayer insulating film 23 (see FIG. 4B). Then, a 2000 A-thick aluminum is evaporated on it, and a light reflective pixel electrode 24 is created by patterning. The pixel electrode 24 has light blocking and light reflecting properties. By sandwiching liquid crystal 25 with the substrate part on the glass substrate 28 and the transparent conductive film 26 formed on the glass substrate 27, there is completed the liquid crystal light valve in accordance with the present invention.

For the signal light and the projection light in the present invention, He-Ne laser beams of the light in the visual radiation range is used for scanning or uniform irradiation.

One of problems encountered in the prior art of requiring an extensive time for manufacturing process may be easily solved by this invention which consumes only several fractions of the time needed by the conventional art. As described in the foregoing statement, the thickness of the thin films which are elements of this invention LCLV remains in the order of 3000 Å at maximum, and the gate insulating film, the amorphous silicon film and the n+ amorphous silicon film may be formed continuously to greatly contribute to the reduction of time required for the formation of multilayer films.

A display contrast can be remarkably improved by this invention. While the changes in voltage applied to the liquid crystal is smaller in the prior art LCLV owing to the conventional device capacitor voltage dividers, this invention LCLV uses a combination of a photo-detector circuit and a TFT drive circuit to allow as much fluctuation in voltage as possible so far as the thin film transistors can stand the voltage. While the contrast obtained by the prior art LCLV was 8 or less, this invention liquid crystal light valve attains 20 to 30 easily.

In this embodiment, the output voltage at the node Y possesses a memory effect that lasts for a predetermined duration until the capacitor 2 discharges spontaneously. If need arises to ensure a perfect resetting at the output voltage at the node Y, low voltage terminal 7 and the high voltage terminal 6 may be short-circuited.

Figure 5:
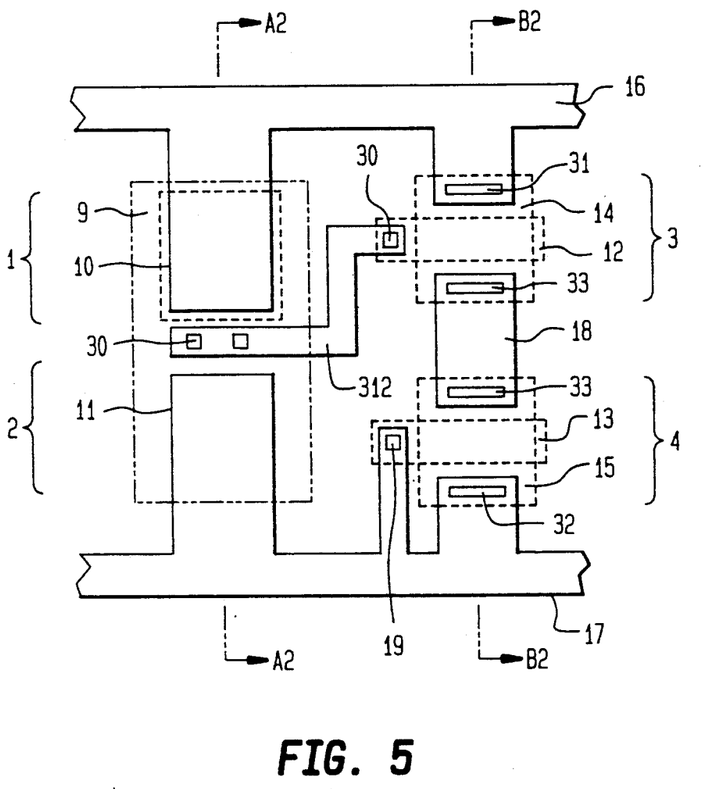
FIG. 5 shows a plan view for explaining an alternative embodiment of the structure of one unit of the optical switching portion in FIG. 2
Figure 6A:
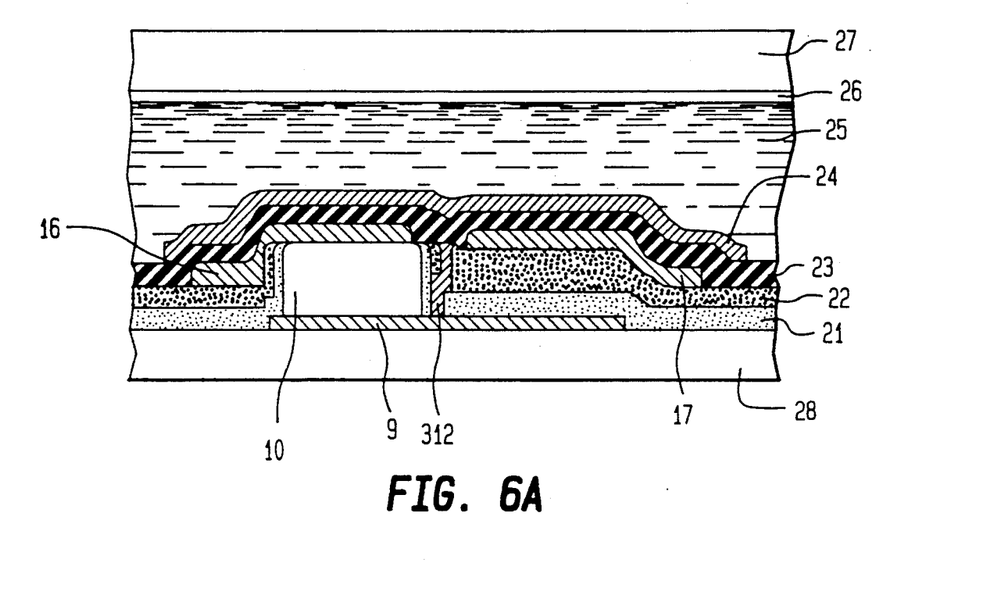
FIG. 6A shows a sectional view taken along the line A2—A2 in FIG. 5.
Figure 6B:
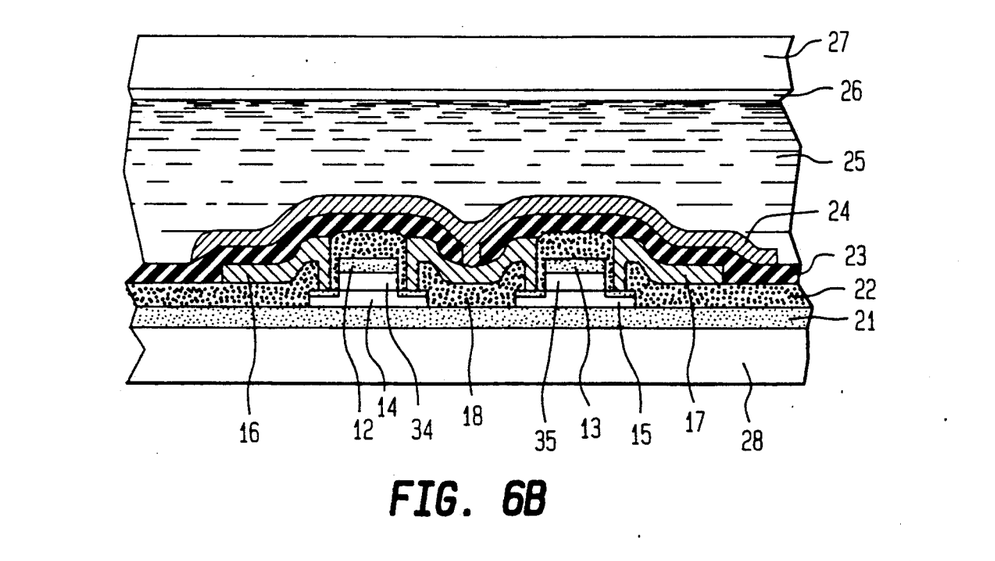
FIG. 6B shows a sectional view taken along the line B2—B2 in FIG. 5.

Another example of the optical switching portion of the first embodiment is shown in FIG. 5 and FIG. 6.

As shown in FIG. 5, a plurality of contact holes 30 are provided for the connection of the transparent electrode 9 and the gate electrode 12 via a connecting electrode 312. A contact hole 31 is provided for the connection of the high voltage electrode 16 and the active layer 14. A contact hole 32 is provided for the connection of the low voltage electrode 17 and the active layer 15. And a plurality of contact holes 33 are provided for the connection of the active layers 14 and 15 via the connecting electrode 18.

In addition, the reference numerals 34 and 35 in FIG. 6B shows gate insulating films, and the constituent components that are similar to those in FIG. 3 and FIG. 4 are assigned identical reference numerals.

One of the differences of the present example from the previous example resides in that the photodiode 1 is made a Schottky type and that the source follower circuit is formed by using polycrystalline silicon.

The fabrication process of a device embodying the present example is as shown below.

First, a 2000 A-thick ITO film is formed on the glass substrate 28 by sputtering and one of the electrodes of the photodiode 1 and the electrode of the capacitor 2 indicated by the reference numeral 9 is formed by sputtering, as shown in FIG. 5. Following that a 10000 A- (namely, 1 μm-) thick amorphous silicon film is formed by decomposing silane. Then, the light absorbing layer 10 of the photodiode 1 is formed by patterning the film (see FIG. 5 and FIG. 6A).

Next, a 3000 A-thick silicon nitride film 21 is formed by decomposing the mixture of silane, ammonia (NH$_3$), and nitrogen to be served as the dielectric for the thin film capacitor. In other words, it is used as the insulating film 21 that is served also as the dielectric of the capacitor 2 analogous to the previous example. In addition, this layer is also served as the substrate protective film for the source follower part. Next, a 2000 A-thick polycrystalline silicon film is formed by low pressure chemical vapor deposition (LPCVD) at the substrate temperature of 600° C., and active layers 14 and 15 for the thin film transistors 3 and 4 are created by patterning the film.

Then, a 2000 A-thick silicon oxide film is formed again by LPCVD to be served as gate insulating films 34 and 35 (see FIG. 6B). A 2000 A-thick polycrystalline silicon film is formed on top of it, and gate electrodes 12 and 13 are formed by patterning. Then, after depositing phosphorus by PH$_3$ gas plasma on each of the source, drain, and gate regions, phosphorus is doped using a gate mask by means of an excimer laser. Further, the active layers 14 and 15 of the transistors are made depletion type by implanting ions into the layers.

Next, a contact hole is created in the insulating film 21 to establish a connection with the electrode for the photodiode 1 and the capacitor 2. A 3000 A-thick chromium film is formed on top of it and patterned. This is for preventing the disconnection at the step of the electrode to be formed later on.

Next, a silicon nitride film is formed as a passivation film to a thickness of 4000 A by the method employed for the previous example. That is, the film is served as the gate insulating film 22. At the same time, hydrogenation of polycrystalline silicon is also given in this stage. Then, after forming the contact holes 30, 31, 32, and 33 shown in FIG. 5, a 3000 A-thick aluminum film is formed by sputtering, and the high voltage electrode 16, the low voltage electrode 17, and the connecting electrode 18 and 312 are formed by patterning the aluminum film. Thereafter, an interlayer insulating film 22 consisting of silicon nitride is formed on it, analogous to the previous example, and a hole is created to establish a contact between the connecting electrode 18 and the pixel electrode 24. Further, a 2000 A-thick aluminum film is evaporated on them and a light reflective pixel electrode 24 is formed by patterning the film. Then, by covering the liquid crystal 25 with the glass substrate 27 having a transparent electrode 26, the fabrication of the LCLV in accordance with the second embodiment of the present invention is completed.

An in the above, the LCLV of the above embodiments is constructed by forming a one- or two-dimensional array-formed liquid crystal driving circuit that outputs a voltage proportional to the quantity of incident light, on the glass substrate 28 as a transparent insulating substrate, and sandwiching the liquid crystal 25 (or 5) between the glass substrate 28 and the opposed glass substrate 27 having a transparent electrode. As was mentioned in conjunction with FIG. 2, the output of the source follower part is arranged to be used as the signal for one pixel of the liquid crystal. Therefore, first of all, in connection with the problem of prolonged fabrication time in the prior art, the fabrication time can be reduced to a fraction of its value by the use of the construction of the present invention. Namely, as explained in the above examples, the thickness of the various constituent films of the present liquid crystal light valve is on the order of 10000 A (namely, 1 μm) at the most. As a result of the fact that films of this order of thickness can readily be produced, the formation time of the multilayered film and the like can be cut to a large extent according to the present invention since the absolute value of the film thickness is small. This is the reason for the reduction in the fabrication time.

Moreover, the problem relating to the display contrast can also be improved markedly by the construction according to the present invention. As was already mentioned, the voltage change applicable to the liquid crystal according to the prior art is small because of the adoption of the voltage circuit divided by the capacitors. In the examples presented above, use is made of the thin film transistors which enables one to expand the dynamic range to the extent permissible by their breakdown voltage, so that high display contrasts become achievable by the adoption of the construction of the present invention. To cite an actual example, in contrast to the achievable contrast of 8 or less by the prior art device, it is of no problem to realize a maximum contrast in the range of 20 to 30 by means of the liquid crystal light valve in accordance with the present invention.

It should be noted that the actual liquid crystal 25 (or 5) used in the above-mentioned two examples is twisted nematic liquid crystal which permits the medium contrast representation. Further, it is to be noted that, although not shown, a polarizing plate is placed on the glass substrate 27, as was already mentioned, and that a signal light is incident upon the device from the side of the glass substrate 28 while a projection light impinges upon the same from the side of the glass substrate 27.

Moreover, as can be seen from FIG. 6, the pixel electrode 24 completely covers the two thin film transistors 3 and 4, the photodiode 1, and the capacitor 2, so that the projected light is prevented from reaching these elements. In addition, the two thin film transistors 3 and 4 in the first example will not be affected by the signal light since both of them have the respective gate electrodes. The thin film transistors 3 and 4 in the second example are made of polycrystalline silicon as already mentioned having no sensitivity to light so that there is no need for shielding light. It is to be noted that in this example there is produced a gap between pixel electrodes 24 that are laterally adjacent. Should the leakage of signal light through the gap be of any problem, it is only needed to form a light shielding film that fills in the gap at the same time when the films 12 and 13 are formed.

Furthermore, silicon oxide in place of silicon nitride may be used for the gate insulating films and the like. Moreover, in connection with the formation of polycrystalline silicon in the second example, there is available such a method in which amorphous silicon is formed by LPCVD at low temperature or molecular beam deposition (MBD) then polycrystallize the amorphous silicon by means of solid phase growth, laser annealing, or the like.

Next, referring to FIG. 7 to FIG. 9, a second embodiment of the present invention will be described. The difference of the equivalent circuit in FIG. 7 from the equivalent circuit in FIG. 2 is that the thin film transistors 3 and 4 of the TFT driver circuit are arranged to form an inverter circuit.

Figure 7:
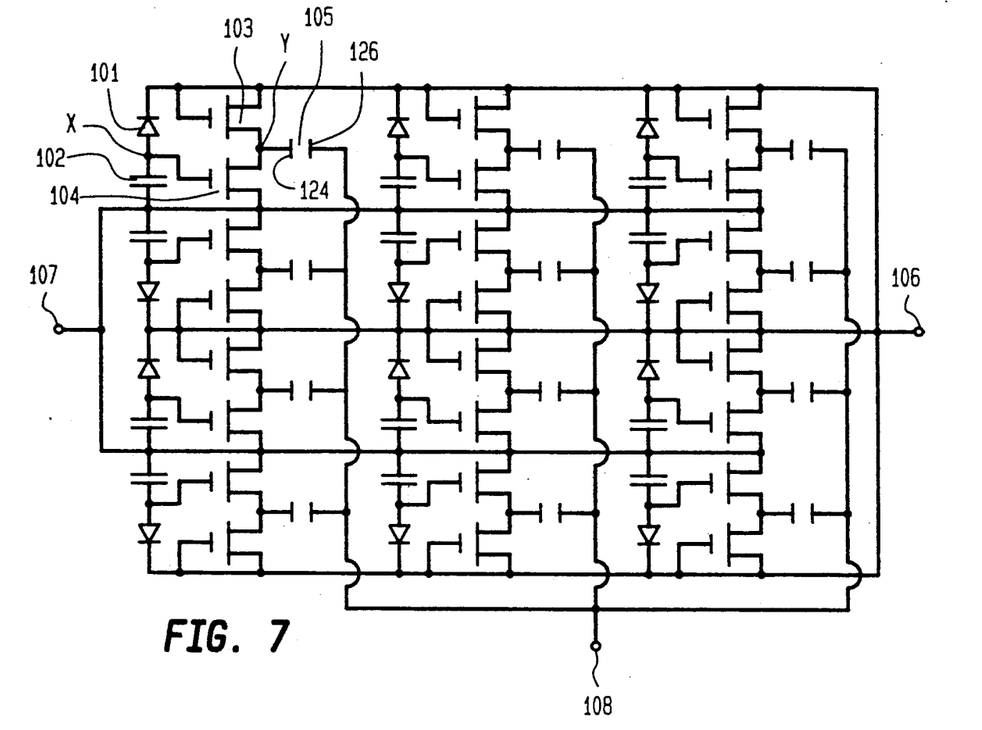
FIG. 7 shows an equivalent circuit of the liquid crystal light valve according to a second embodiment of the present invention.

FIG. 7 shows the case of the display cells with 4 rows and 3 columns. A photo-detector circuit comprises a photodiode 101 and a capacitor 102 serially connected between a high voltage electrode 106 and a low voltage electrode 107 such that a reverse bias voltage is applied to the photodiode 101. Since the structure and its function of the photo-detector circuit is the same as the first embodiment, an output voltage from the photo-detector circuit at node X is proportional to the quantity of incident light.

The above output voltage is used as the input voltage to an inverter circuit formed by thin film transistors 103 and 104. Depending upon whether the input voltage exceeds the threshold voltage of the thin film transistor 104 (called switching transistor hereinafter), the switching transistor 4 is turned on or off. As a result, a voltage is output which is substantially equal to the potential of the low voltage electrode when the switching transistor 4 is turned on while a voltage is output which is equal to the potential of the high voltage electrode less the threshold value of the thin film transistor 103 (called loading transistor hereinafter).

This output possesses a memory effect for a predetermined period of time until the capacitor 102 discharges spontaneously as described in the first embodiment.

The photodiode is a device that has a very high speed. Accordingly, the response of the device is determined by the time in which the capacitor is charged by the photocurrent of the photodiode, and the potential of the capacitor exceeds the threshold of the switching transistor of the inverter. Although this time depends on the design, it is on the order of several microseconds so that it is far small then the RC constant of the prior art liquid crystal light valve. Therefore, if ferroelectric liquid crystal is used for liquid crystal 105, there can be obtained a liquid crystal light valve that is much faster than the prior art device.

Figure 8:
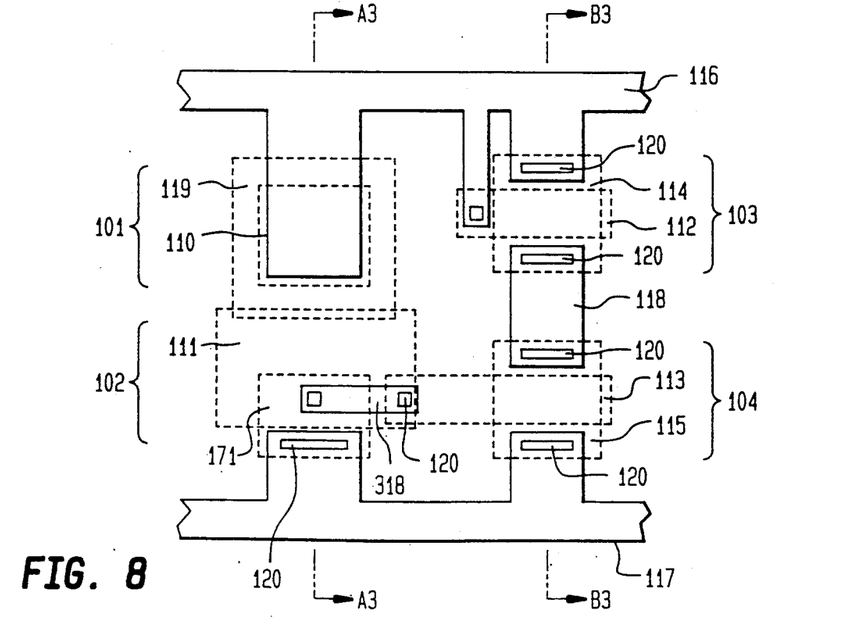
FIG. 8 shows a plan view for explaining an example of the structure of one unit of an optical switching portion in FIG. 7.
Figure 9A:
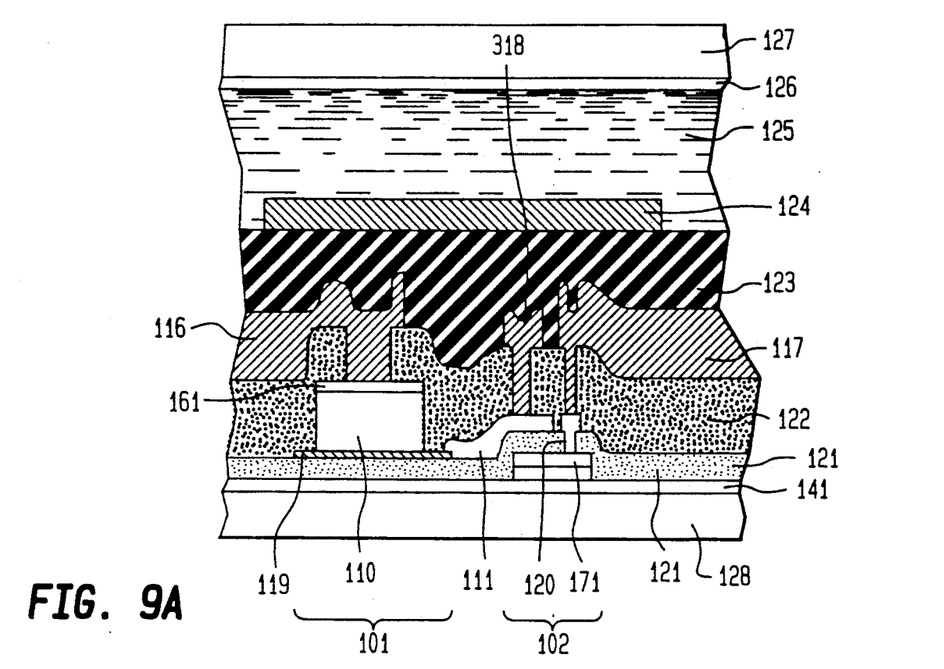
FIG. 9A shows a sectional view taken along the line A3—A3 in FIG. 8.
Figure 9B:
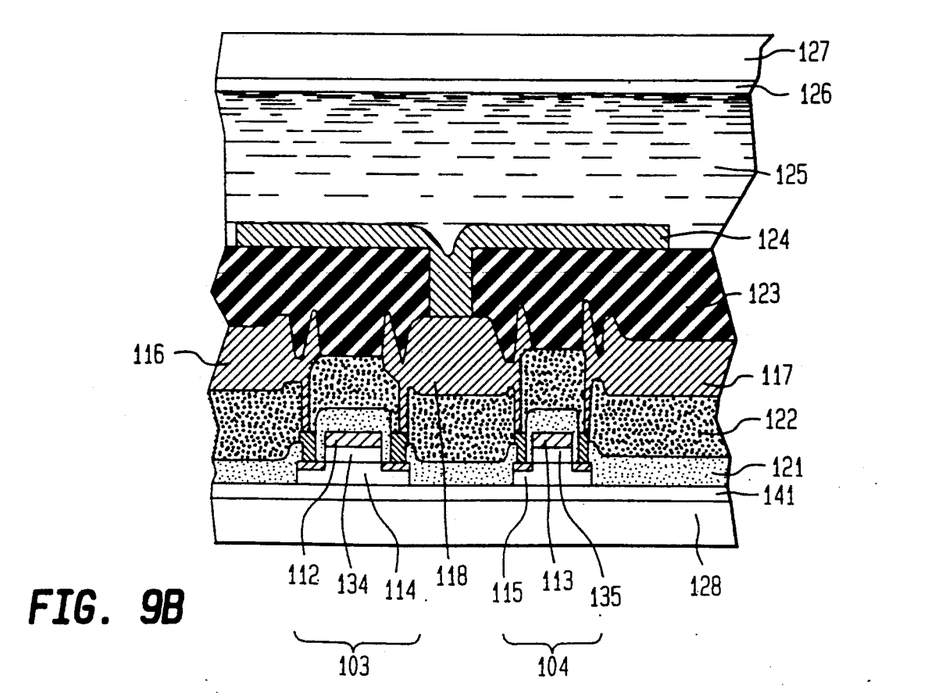
FIG. 9B shows a sectional view taken along the line B3—B3 in FIG. 8.

Referring to FIG. 8 and FIG. 9, the second embodiment of the present invention will be described in more detail.

In this embodiment, the photodiode 101 is made Schottky barrier type, and the inverter circuit is formed with polycrystalline silicon. The fabrication process of the device is as described below.

First, a 2000 A-thick silicon oxide film 141 is formed on a glass substrate 128 by LPCVD at the substrate temperature of 600° C. serve as a protective film. A 2000 A-thick polycrystalline silicon film is formed on the silicon oxide film 141, and active films 114 and 115 of the transistors are obtained by sputtering.

Next, after forming a 2000 A-thick silicon oxide film by LPCVD, and consecutively forming a 2000 A-thick polycrystalline silicon film on it, gates 112 and 113 are obtained by patterning. Further, an excimer laser doping using $PH_3$ gas is applied to a part respectively of the active layers 114 and 115. In addition, one of the electrodes, 117, of the capacitor is formed simultaneously.

Next, a 3000 A-thick silicon nitride film is formed by decomposing the mixture of silane, ammonia, and nitrogen, and is served as the dielectric 121 of the thin film capacitor.

Next, a 2000 A-thick ITO film is formed on the glass substrate by sputtering, and one of the electrodes, 119, of the photodiode is formed by patterning as shown in FIG. 8. After forming a contact hole 120 in the silicon nitride film 121, a 3000 A-thick chromium film is formed by sputtering, and the other electrode 111 of the capacitor is formed by patterning the chromium film.

Next, a 10000 A- (namely, 1 μm-) thick amorphous silicon film is formed by decomposing silane. Further, a 3000 Å-thick chromium film is formed, and a photodiode electrode 161 and a photodiode light absorbing layer 10 are formed.

Next, a 6000 Å-thick silicon nitride film is formed, and serves as an insulating film 122 between the electrode. After forming contact holes 120, a 6000 Å-thick aluminum film is formed by sputtering, and a high voltage electrode 116, a low voltage electrode 117, and connecting electrodes 118 and 318 are formed by sputtering.

Next, an interlayer insulating film 123 consisting of silicon nitride is formed on them, and a hole for establishing the contact between the electrode 118 and the pixel electrode 124 is created in the film 123. Further, a 2000 Å-thick aluminum film is evaporated on them, and the pixel electrode 124 is created by patterning. The pixel electrode 124 has light reflecting and light blocking properties. Then, the liquid crystal light valve according to the present invention is completed by sandwiching the liquid crystal 125 between a glass substrate 127 having a counter electrode 126 which is an ITO transparent electrode and the glass substrate 128.

For the liquid crystal, a ferroelectric liquid crystal is used to achieve the high speed operation. It should be noted that a polarizing plate is placed on the glass substrate 127, though not shown, and that a signal light is incident on the device from the side of the glass substrate 128 while a projection light impinges on the same from the side of the glass substrate 127.

For the interlayer insulating film, organic insulating materials such as polyimide may also be used in addition to what was mentioned in the above. Moreover, for the formation of polycrystalline silicon such a method is also available in which amorphous silicon is formed by LPCVD at low temperature or MBD and then polycrystallizes the amorphous silicon by solid phase growth, laser annealing, or the like.

Figure 10:
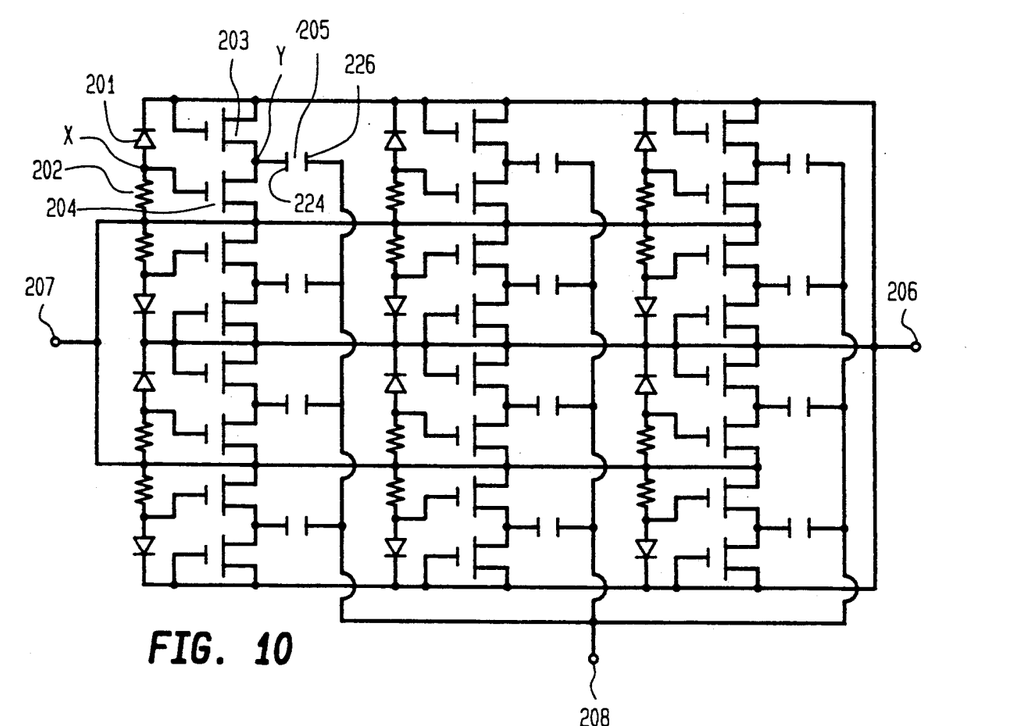
FIG. 10 shows an equivalent circuit of the liquid crystal light valve according to a third embodiment of the present invention.

Next, referring to FIG. 10, a third embodiment of the present invention will be described. The difference of the present embodiment from the second embodiment shown in FIG. 7 is that the capacitor is replaced by a resistor. Namely, a photodiode 201 and a resistor 202 that does not have sensitivity to light form a photo detector circuit as a voltage dividing circuit. A loading transistor 202 and a switching transistor 204 form the same inverter circuit as that shown in FIG. 7. The voltage dividing circuit and the inverter circuit form an optical switching portion, and the output of the inverter circuit at a node Y is used as a signal to one pixel electrode 224 for the liquid crystal.

Next, referring to an equivalent circuit shown in FIG. 10, the operation of the present embodiment will be described.

A voltage determined by a high voltage electrode 206 and a low voltage electrode 207 is applied to the voltage dividing circuit consisting of the photodiode 201 and the resistor 202, with reverse bias to the photodiode 201. The device is designed such that the dark resistance of the photodiode 201 is larger than the resistance of the resistor 202 that has no sensitivity to light when the photodiode is not irradiated with light. Accordingly, the potential at a node X is close to the potential $V_L$ of the low voltage electrode 206. The potential $V_L$ is determined to be smaller than the threshold of the switching transistor 204 so that the switching transistor 204 is not energized, and the output at the node Y is at a potential which is the potential $V_H$ of the high voltage electrode 207, less the threshold voltage of the load transistor 203.

On the contrary, in the state irradiated with light, when the bright resistance of the photodiode becomes sufficiently small compared with the resistance of the resistor 202, the potential at the node X approaches the potential $V_H$ of the high voltage electrode 207. Because of this, the voltage becomes a value exceeding the threshold voltage of the switching transistor 204, the switching transistor 204 is turned on, and the output at the node Y becomes substantially equal to the potential $V_L$ of the low voltage electrode 207.

If the voltage $V_C$ to be applied to a common electrode 226 connected to counter electrode terminal 208 is set at the valve of $(V_H-V_L)/2$, the voltage of this level would be applied to the liquid crystal cell 205 either in positive or in negative value depending on the intensity of the light. This enables variation in voltage applied to the liquid crystal cell which is larger than the prior art LCLV. A typical example of $V_H$ is $+15$ V, $V_L$ is $-15$ V and $V_C$ is ground level.

Next, referring to FIG. 11 and FIG. 12, the structure of the third embodiment of the liquid crystal light valve in accordance with the present invention will be described along with its fabrication process. The present embodiment has common features with the second embodiment in that the photodiode is made to be of Schottky barrier type and the inverter part is formed with polycrystalline silicon.

First, a 2000 Å-thick silicon oxide film is formed by LPCVD with the substrate temperature of 600° C. on a glass substrate 228 which is a transparent insulating substrate to be served as a substrate protective film 241. A 2000 Å-thick polycrystalline silicon film is formed continuing to the above step, and active layers 214 and 215 for a load transistor 203 and a switching transistor 204, respectively, are created by patterning as indicated in FIG. 11.

Next, after forming a 2000 Å-thick silicon oxide film again by LPCVD, and consecutively forming a 2000 Å-thick polycrystalline silicon film on top of it, gate electrodes 212 and 213 for the load transistor 203 and the switching transistor 204 are created by patterning. Further, an $n^+$-type polycrystalline silicon film is formed by an excimer laser doping with $PH_3$ gas plasma that uses the gate electrodes as the mask.

Figure 11:
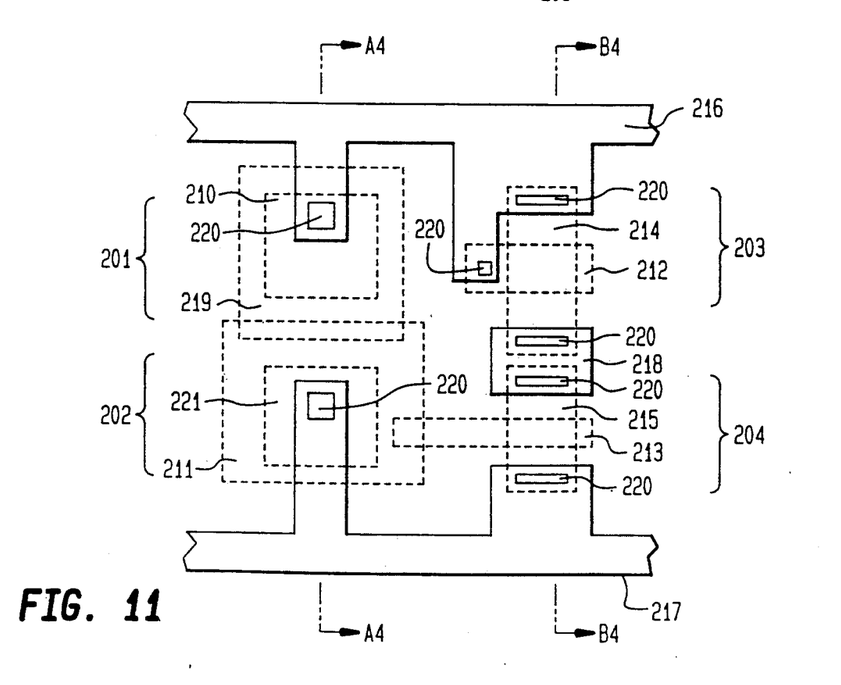
FIG. 11 shows a plan view for explaining an example of the structure of one unit of an optical switching portion in FIG. 10.
Figure 12A:
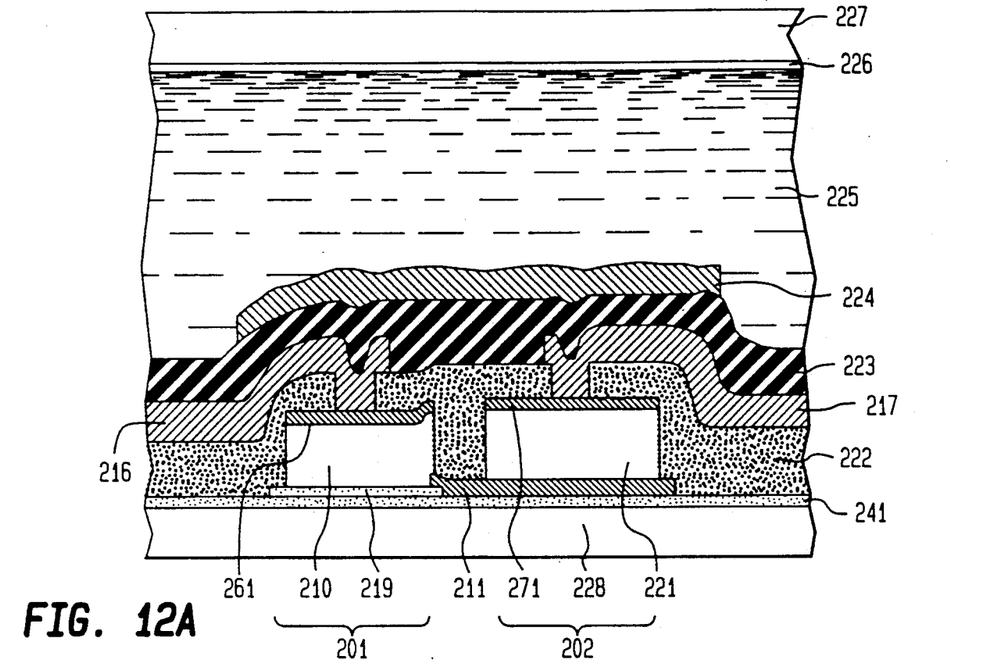
FIG. 12A shows a sectional view taken along the line A4—A4 in FIG. 11.
Figure 12B:
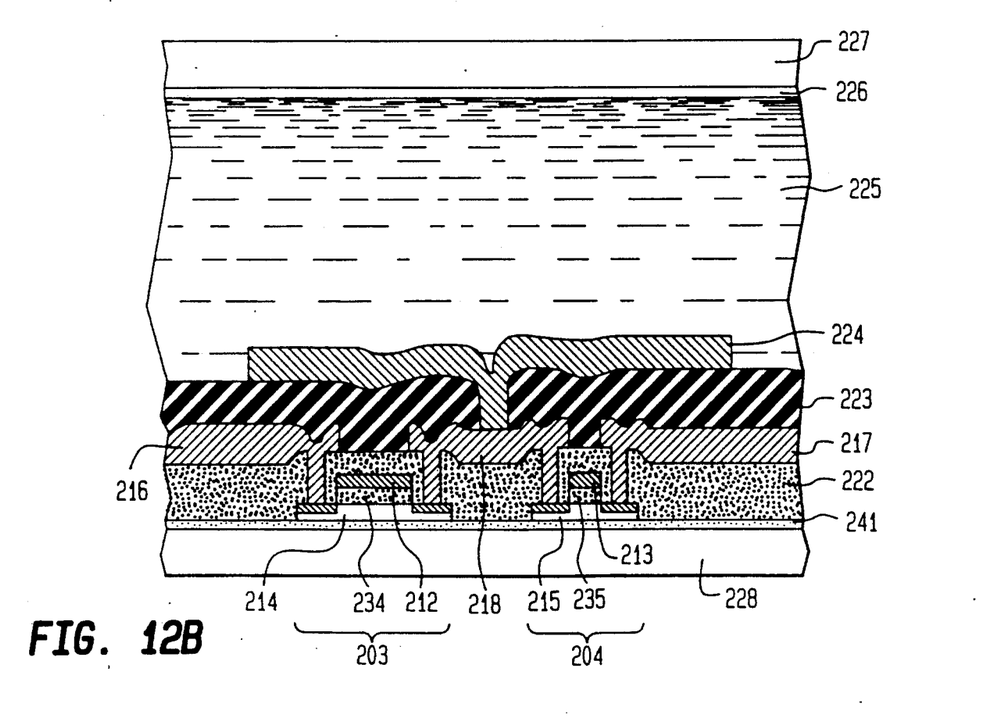
FIG. 12B shows a sectional view taken along the line B4—B4 in FIG. 11.

Next, a 1000 Å-thick ITO film is formed by sputtering, and a lower electrode (photodiode electrode) 219 of the photodiode is formed by patterning as indicated in FIG. 11. Further, a 1500 Å-thick chromium film is formed by sputtering, and a lower electrode (resistor electrode) 211 of the resistor is created by patterning. The resistor electrode 211 has a light blocking property.

Next, a 1000 Å- (namely, 1 μm-) thick amorphous silicon film is formed by decomposing silane. This becomes a light absorbing film 210 of the photodiode. Further, a 3000 Å-thick chromium film is formed and patterned to provide a contact electrodes 261 and 271 for a photodiode 201 and a resistor 221 that has no sensitivity for light, respectively. The contact electrodes 261 and 271 has a light blocking properties.

Next, a 6000 Å-thick silicon nitride film is formed to be used as an interlayer insulating film 222. After forming contact holes 220, a 6000 Å-thick aluminum film is formed by sputtering, and a high voltage electrode 216, a low voltage side electrode 217, and an output electrode 218 are formed by patterning.

Next, an interlayer insulating film 223 consisting of a 6000 A-thick silicon nitride film is formed, and a hole is formed in the film for establishing the contact between the output electrode 218 and a pixel electrode 224 to be described later. Further, a 4000 A-thick aluminum film is evaporated on top of it, and a pixel electrode 224 is formed by sputtering. The pixel electrode 224 has light reflecting and light blocking properties.

Then, the fabrication of the liquid crystal light valve in accordance with the present invention is completed by covering liquid crystal 225 with a glass substrate 227 having a counter electrode 226 which is a transparent electrode thereon. For the liquid crystal a ferroelectric liquid crystal is employed in order to make an active use of its high speed feature.

For the interlayer insulating films 222 and 223, organic insulating materials such as polyimide may also be used in addition to what is used in the present embodiment. Moreover, for the formation of polycrystalline silicon use may also be made of such a method in which amorphous silicon is formed by LPCVD at low temperature or MBD, and then the amorphous silicon is polycrystallized by means of solid phase growth, laser annealing, or the like.

It should be noted that although an inverter circuit is formed with a pair of transistors in the third embodiment of the present invention just mentioned, the object of the present invention will also be achieved by arranging the transistors to constitute a source, follower circuit as shown in FIG. 2.

As has been described in the foregoing, the present invention enables easy manufacture of a liquid crystal light valve which have a high display contrast, thus offering an extremely industrial utility.

What is claimed is:

1. A liquid crystal light valve comprising a first transparent insulating substrate provided with a plurality of light switching elements respectively connected to pixel electrodes, a second transparent insulating substrate provided with transparent electrodes, and a liquid crystal sandwiched between the first substrate and the second substrate, each of said light switching elements including a photo-detector circuit and a transistor drive circuit respectively connected between a high voltage terminal and a low voltage terminal, each of said photo-detector circuits comprising a photodiode and a capacitor element serially connected to each other, a cathode of said photodiode being connected to said high voltage terminal, an input terminal of said transistor drive circuit being connected to a node connecting said photodiode and said capacitor element, and an output terminal of said transistor drive circuit being connected to said pixel electrodes.

2. The liquid crystal light valve as claimed in claim 1, wherein said transistor drive circuit constitutes a source follower circuit using a thin-film-transistor.

3. The liquid crystal light valve as claimed in claim 1, wherein said transistor drive circuit comprises a switching thin film transistor and a loading thin film transistor, source-drain paths of said switching and loading thin film transistors being connected in series, said switching thin film transistor having a first gate electrode connected to said node connecting said photodiode and said capacitor element, and said loading thin film transistor having a second gate electrode connected to said high voltage terminal.

4. The liquid crystal light valve as claimed in claim 3, wherein active areas of said photodiode, said capacitor element, and said switching thin film transistor and active areas of said loading thin film transistor are made of amorphous silicon, and a light blocking conductor film is sandwiched between said passive element and said first substrate.

5. A liquid crystal light valve comprising first and second transparent plates, a liquid crystal layer formed between said first and second transparent plates, a transparent electrode formed between said first transparent plate and said liquid crystal layer, plural light reflective electrode layers formed between said second transparent plate and said liquid crystal layer, and optical switching elements formed between each of said light reflective electrode layers and said second transparent plate, said light switching elements respectively including a photo-detector circuit and a thin-film-transistor drive circuit constituting a source follower circuit, each of said photo-detector circuits comprising a photodiode member and a passive element layer serially connected to each other between a pair of wiring electrodes having a potential difference therebetween, said drive circuit receiving the voltage produced by said photo-detector circuit as an input, and the output from said drive circuit being connected to said respective light reflective electrode layer so that the output from said photo-detector circuit is controlled by the amount of the incident light on said photodiode member to thereby control the voltage applied on said respective light reflective electrode.

6. A liquid crystal light valve comprising a first transparent insulating substrate provided with a plurality of light switching elements respectively connected to pixel electrodes, a second transparent insulating substrate provided with transparent electrodes, and a liquid crystal sandwiched between the first substrate and the second substrate, each of said light switching elements including a photo-detector circuit and a transistor drive circuit respectively connected between a high voltage terminal and a low voltage terminal, said transistor drive circuit constituting a source follower circuit, said photo-detector circuit comprising a photo-diode and a capacitor element serially connected to each other, a cathode of said photo-diode being connected to said high voltage terminal, an input terminal of said transistor drive circuit being connected to a node connecting said photodiode and said capacitor element, an output terminal of said transistor drive circuit being connected to said pixel electrodes.

* * * * *